US012135684B1

(12) United States Patent
Allen et al.

(10) Patent No.: US 12,135,684 B1
(45) Date of Patent: Nov. 5, 2024

(54) PREDICTIVE TIERED ASSET STORAGE BASED ON ESG STORAGE COSTS

(71) Applicant: Iron Mountain Incorporated, Boston, MA (US)

(72) Inventors: William J. Allen, Corvallis, OR (US); Nicole C. Reineke, Northborough, MA (US); Calvin He, Boston, MA (US)

(73) Assignee: Iron Mountain Incorporated, Portsmouth, NH (US)

( * ) Notice: Subject to any disclaimer, the term of this patent is extended or adjusted under 35 U.S.C. 154(b) by 0 days.

(21) Appl. No.: 18/138,370

(22) Filed: Apr. 24, 2023

(51) Int. Cl.
*G06F 16/11* (2019.01)
*G06F 16/16* (2019.01)
*G06F 16/185* (2019.01)

(52) U.S. Cl.
CPC .......... *G06F 16/125* (2019.01); *G06F 16/162* (2019.01); *G06F 16/185* (2019.01)

(58) Field of Classification Search
CPC ..... G06F 16/125; G06F 16/162; G06F 16/185
See application file for complete search history.

(56) References Cited

U.S. PATENT DOCUMENTS

| | | | |
|---|---|---|---|
| 7,454,446 B2 * | 11/2008 | Leung | G06F 16/185 |
| 8,078,599 B2 | 12/2011 | Kimura | |
| 8,645,150 B2 | 2/2014 | Akers et al. | |
| 10,528,295 B2 * | 1/2020 | Barajas Gonzalez | G06F 3/0649 |
| 10,535,022 B1 | 1/2020 | Hood et al. | |
| 2006/0053263 A1 * | 3/2006 | Prahlad | G06N 5/04 711/161 |
| 2009/0281846 A1 | 11/2009 | Rose | |
| 2010/0191998 A1 | 7/2010 | Moore | |
| 2011/0071867 A1 | 3/2011 | Chen et al. | |
| 2012/0271669 A1 | 10/2012 | Taper et al. | |
| 2013/0035973 A1 | 2/2013 | Desai et al. | |
| 2021/0264520 A1 * | 8/2021 | Cummings | G06Q 40/12 |
| 2021/0342185 A1 | 11/2021 | Naidu et al. | |
| 2022/0035680 A1 | 2/2022 | Sharma et al. | |
| 2022/0253871 A1 * | 8/2022 | Miller | G06Q 30/018 |
| 2022/0366021 A1 * | 11/2022 | McCarthy | G06F 21/16 |
| 2022/0398515 A1 | 12/2022 | McGuire et al. | |
| 2022/0414560 A1 | 12/2022 | Abele et al. | |

OTHER PUBLICATIONS

McClure, T., "How Re-architecting the File Storage Environment Can Help Reduce Risk and Cost, and Increase Operational Efficiency," The Enterprise Strategy Group, Inc., Jul. 2016 (10 pages).

(Continued)

*Primary Examiner* — Angelica Ruiz
(74) *Attorney, Agent, or Firm* — Nutter McClennen & Fish LLP

(57) ABSTRACT

A tiered data storage management system in which environmental, social, and governance (ESG) factors are used to evaluate and manage storage of physical and corresponding digital assets, particularly (but not limited to) storage of digital assets generated from corresponding physical assets, and particularly (but not limited to) situations in which the cost to store a digital representation of an asset exceeds the cost to store the original physical asset for a given amount of time.

24 Claims, 5 Drawing Sheets

(56) References Cited

OTHER PUBLICATIONS

Naoum, N., "Carbon and the cloud: Why data may be part of the climate change problem," Venture Beat, retrieved from the Internet at https://venturebeat. com/business/carbon-and-the-cloud-is-data-part-of-the-climate-change-problem/, Apr. 22, 2022 (10 pages).

Ng, V., "Data storage and ESG trends," DigiconAsia, retrieved from the internet at https://www.digiconasia.net/ features/data-storage-and-esg-trends, dated Nov. 9, 2022 (23 pages).

Ranganathan, J., et al., "The Greenhouse Gas Protocol (revised edition)", World Resources Institute and World Business Council for Sustainable Development, Mar. 2004 (116 pages).

Sinclair, S., et al. "For Unstructured Data in the Cloud, Look to NetApp," TechTarget, Inc., Nov. 2022 (6 pages).

\* cited by examiner

PREDICTIVE TIERED ASSET STORAGE BASED ON ESG STORAGE COSTS

CROSS-REFERENCE TO RELATED APPLICATION(S)

None.

FIELD OF THE INVENTION

The invention generally relates to asset storage management systems and methods that manage storage of physical and/or digital assets based at least in part on environmental, social, and governance (ESG) factors.

BACKGROUND OF THE INVENTION

In today's world, companies are often managed and judged (both internally and externally) on various environmental, social, and governance (ESG) factors. Generally speaking, environmental factors can include such things as direct and indirect greenhouse gas emissions as well as utilization and management of natural resources; social factors can include such things as a company's employment practices (e.g., fair wages, equity/diversity/inclusion initiatives, etc.) as well as the company's impact on the communities in which it operates; and governance factors can include such things as how the company is led and managed with regard to such things as employee relations, executive and employee compensation, stakeholder expectations, transparency, and accountability.

With increasing frequency, global organizations are held accountable for their environmental impact by industry or government emerging standards. This includes baseline requirements as outlined in the Greenhouse Gas (GHG) value chain accounting report (https://ghgprotocol.org/sites/default/files/standards/ghg-protocol-revised.pdf). Per this GHG protocol, GHG categorizes three scopes:

Scope 1 covers direct emissions from owned or controlled sources;

Scope 2 covers indirect emissions from the generation of purchased electricity, steam, heating and cooling consumed by the reporting company; and Scope 3 includes all other indirect emissions that occur in a company's value chain.

Among other things, the GHG protocol indicates that leased assets, such as hosting location, storage, and cloud operations, will require a minimum reporting of power consumed during operation of leased assets.

SUMMARY OF VARIOUS EMBODIMENTS

In accordance with one embodiment of the invention, predictive tiered asset storage based on environmental, social, and governance (ESG) factors involves causing storage of an original physical asset in a first storage medium; causing storage of a first digital representation of the original physical asset in a second storage medium different than the first storage medium; monitoring a set of storage parameters for the original physical asset including a storage cost for storage of the original physical asset and the first digital representation, wherein the storage cost is based on at least one ESG factor associated with the asset; causing deletion of the first digital representation from the second storage medium to leave only the original physical asset based on a first change of the at least one ESG factor that changes the storage cost; and continuing monitoring of the set of storage parameters to determine when another digital representation of the original physical asset is required in the system.

In various alternative embodiments, storage of the original physical asset in the first storage medium and the first digital representation of the original physical asset in the second storage medium represents a first storage tier of a plurality of storage tiers and deletion of the first digital representation from the second storage medium to leave only the original physical asset represents a second tier of the plurality of storage tiers, and wherein causing deletion of the first digital representation from the second storage medium to leave only the original physical asset is further based on a cost for transitioning from the first storage tier to the second storage tier, a cost for subsequently causing creation of the second digital representation, and a likelihood that the second digital representation will be required. The cost to store the first digital representation in the second storage medium may exceed the cost to store the original physical asset in the first storage medium for a given amount of time. Monitoring the storage cost may be based on a set of stored storage management rules that define the storage cost based on the at least one ESG factor and that are triggered by one or more watch services. The at least one ESG factor may be based on at least one scope defined by World Resources Institute GHG Protocol Initiative. Causing deletion of the first digital representation may be further based on at least one of a change in estimation of likelihood of a future need to access a digital representation of the physical asset; a change in storage cost of the physical asset; a change in storage cost of the first digital representation; a change in availability of storage options for a digital representation of the physical asset; or a change in user access time to a digital representation of the physical asset. The process may further include creating and storing an artifact identifier record referencing the original physical asset stored in the first storage medium and the first digital representation stored in the second storage medium, the artifact identifier record including the storage cost for storage of the original physical asset and the first digital representation; updating the storage cost in the artifact identifier record when the first digital representation is deleted; and updating the storage cost in the artifact identifier record when the second digital representation is created and stored, wherein the artifact identifier record tracks the storage cost for the asset based on at least one ESG factor. The process may further include causing creation of a second digital representation of the original physical asset and storage of the second digital representation in a third storage medium upon determining that another digital representation of the original physical asset is required in the system.

Embodiments described and claimed herein have the effect of transforming computerized asset storage systems to utilize ESG factors to manage storage of physical and/or digital assets. For at least these reasons, the activities described and claimed herein provide a technological solution to a problem that arises squarely in the realm of technology and are not well-understood, routine, or conventional to a skilled artisan in the field of the present invention.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

Figure 1:
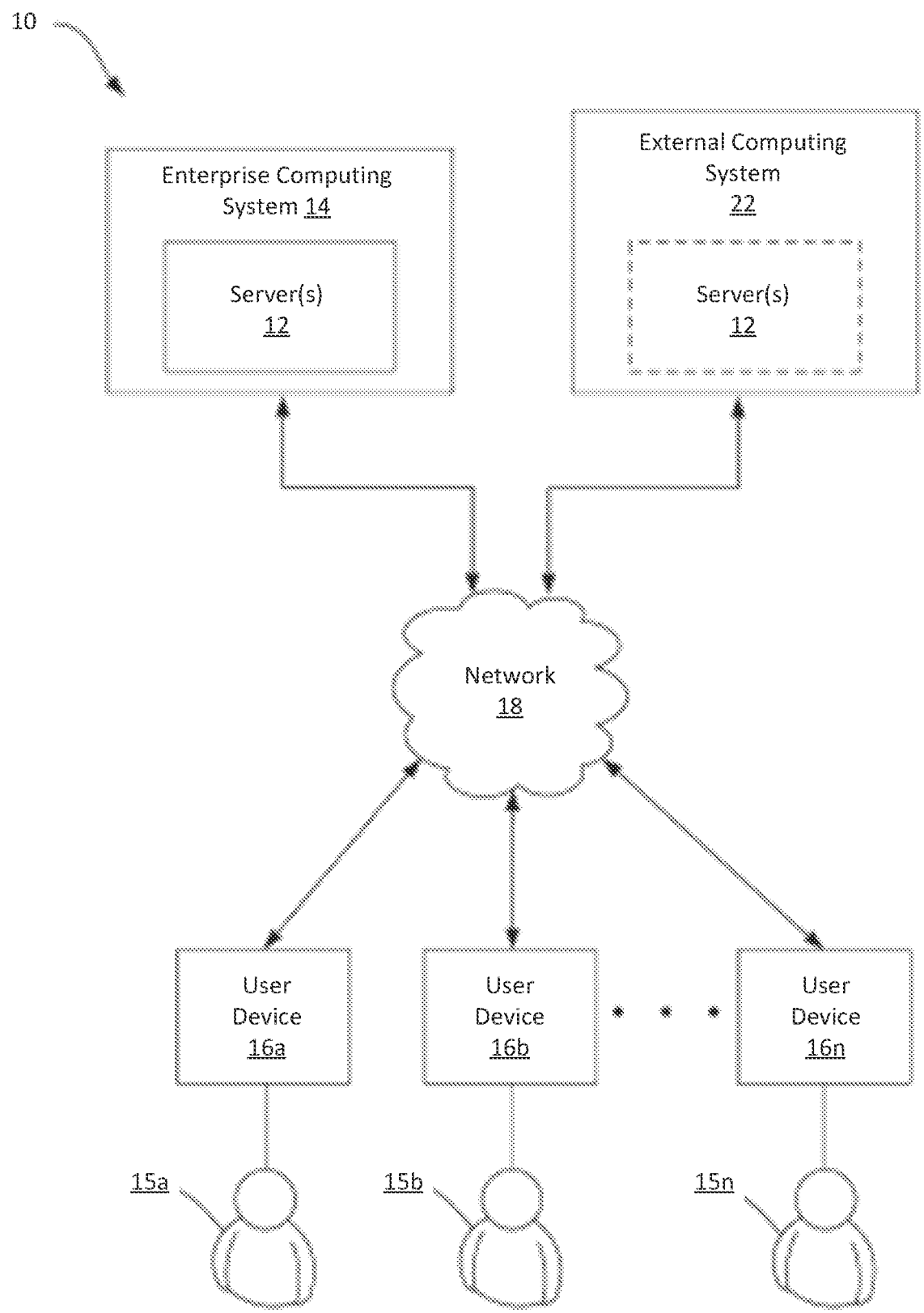
FIG. 1 is a schematic block diagram illustrating one embodiment of an exemplary asset storage management system consistent with the present disclosure.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Definitions. As used in this description and the accompanying claims, the following terms shall have the meanings indicated, unless the context otherwise requires.

A "set" includes one or more members, even if the set description is presented in the plural (e.g., a set of Xs can include one or more X).

Certain embodiments provide a tiered data storage management system in which environmental, social, and governance (ESG) factors are used to evaluate and manage storage of physical and corresponding digital assets, particularly (but not limited to) storage of digital assets generated from corresponding physical assets (e.g., digitization of "hard" assets such as paper documents and photographs; digitization of data on analog storage devices such as audio or video data from tape storage; digital copies of data from digital storage devices such as files from a CD-ROM; digitization of medical/pathology samples; a medium encasing a unique physical specimen that can be represented digitally but cannot be replicated in full such as a slide suitable for viewing in a microscope, tissue slice samples, a test tube with liquid contents, a jar containing preserved organic matter, a piece of memorabilia, an original painting; etc.), and particularly (but not limited to) situations in which the cost to store a digital representation of an asset exceeds the cost to store the original physical asset for a given amount of time (referred to herein for convenience as "tiered storage cost inversion").

For example, while it can be less expensive from a financial cost perspective to store certain types of assets such as hardcopy documents, a silver halide photograph, or a silver halide radiograph in digital form compared to the cost of storing the original physical asset (e.g., a banker's box of hardcopy documents containing 2000 pages might cost around $3/year to store in a secure warehouse while corresponding digital copies of those hardcopy documents occupying around 4 GB of space might cost around $0.50/year to store using cloud storage), it can be more expensive to store digital copies of other types of physical assets such as pathology slides, histological tissue blocks, and 3D objects compared to the cost of storing the original physical asset (e.g., storage cost for digital representations of pathology slides might cost 6×-8× the cost to store the original physical slide assets). Also, there are inherent costs involved with generating or regenerating a digital asset from a physical asset (e.g., scanning or rescanning) as well as inherent costs involved with converting a digital asset to a physical asset (e.g., printing a hard copy of a digital asset for physical storage).

In addition to financial costs, it is important to recognize that there are also inherent ESG costs (both positive and negative) for both physical and digital asset storage such as, for example, attributable greenhouse gas emissions and energy consumption from fabrication and operation of the storage facility, energy efficiency costs (e.g., replacement of old equipment with newer and more efficient equipment, increasing use of renewable energy resources, purchasing carbon credits, etc.), social justice costs (e.g., hiring and salary practices, Equity Diversity Inclusion (EDI) practices/advances, etc.), governance costs (e.g., improving transparency, reducing wealth gap between executive and employees, etc.), etc. Some ESG costs might be determined and reported by the storage facility operator such as part of the GHG protocol (e.g., annual emissions), while other ESG costs are more subjective and less easily quantifiable and can be determined in different ways and can even be determined differently for different storage users (e.g., a first storage user might rate a particular storage facility positively due to social justice practices while a second storage user might rate that same storage facility negatively due to poor environmental practices). Of course, an overall ESG cost can be determined for a facility based on a combination of ESG factors such as, for example, a weighted average of multiple ESG cost scores. Furthermore, ESG cost is not necessarily a singular measurement or happening but instead can be an ongoing or lifetime measurement that may include concepts such as annual emissions per asset, energy efficiency per storage type or location, emissions at asset access, etc. ESG cost associated with a particular storage facility can be allocated to a given asset in different ways (e.g., for digital storage, ESG cost for a particular asset could be based on the ratio of the amount of digital storage used for the particular asset to the overall amount of digital storage at the facility, times the overall ESG cost for the facility) and is not necessarily "fixed" but in some cases can vary over time, e.g., due to changes in ESG metrics such as energy usage or energy efficiency over time. Thus, the present invention is not limited to any particular way of assigning ESG costs to a particular facility or asset.

Therefore, the overall cost to store an asset can be determined in terms of ESG factors (e.g., greenhouse gas emissions, energy consumption, etc.) alone and/or in combination with other factors such as financial cost for storage and/or retrieval and/or regenerating a digital copy. Thus, for example, the overall cost to store an asset can be based on ESG factors in combination with financial costs and potentially other considerations and can be evaluated over various time intervals (e.g., greenhouse gas emissions and energy consumption could change seasonally such that, for example, a first storage facility is considered to be more expensive than a second storage facility during one season but less expensive during another season from an ESG perspective). It should be noted that ESG factors can add to and/or subtract from the overall cost associated with asset storage, e.g., a first storage facility could be financially more expensive than a second storage facility but the first storage facility could be deemed to have a lower overall cost for storage management purposes due to ESG factors. Thus, the present invention is not limited to any particular way of assigning an overall cost to a particular asset.

Unfortunately, storage users generally do not have transparency into the physical or digital direct and indirect costs of storage in different media and therefore are unable to make informed decisions and report against those decisions. Even if ESG costs are available, managing storage of assets across multiple tiers is unwieldy and beyond the capabilities of most storage users, and in any case many storage users outsource their data storage management to a provider who would need to manage asset storage across multiple users, multiple assets and asset types, multiple storage providers, multiple types of storage media, and user-specific ESG goals.

Thus, an automated system such as disclosed herein is needed to ensure alignment of predictive asset digitization, digital asset placement, original asset placement, and original asset maintenance in a way that takes into account each storage user's ESG and other cost goals and sustainability/scope emission goals (e.g., some storage users may wish to optimize cost exclusively, others may prioritize optimizing the environmental impact of operations, and others may have complex optimization needs that take multiple factors into account) in a programmatic and scalable manner.

FIG. 1 illustrates one embodiment of an exemplary asset storage management system 10 consistent with the present disclosure. As shown, the system 10 includes one or more servers 12 that, for example, may run on an enterprise computing system 14 and/or an external computing system 22 (e.g., a cloud-based computing system). For convenience, the one or more servers 12 running on one or more computing systems 14, 22 can be referred to collectively as a server system 12. It should be noted that the term "server" is used herein broadly to mean any computing device or system that can perform the types of operations discussed herein and is not limited, for example, to a physical or virtual server computer.

The system 10 also may include one or more user computing devices 16(a)-16(n), which, for convenience, may be referred to herein individually as a user device 16 or collectively as user devices 16. Each user device 16(a)-16(n) is generally associated with a corresponding user 15(a)-15(n), who, for convenience, may be referred to herein individually as a user 15 or collectively as users 15, although it should be noted that certain user devices 16 may be unrelated to a specific user 15 (e.g., a user device 16 may operate autonomously or may be associated with a non-user entity such as a company, vehicle, etc.). In the present context, the users 15 may include administrators, customers, developers, or clients of a service provided by the server system 12. The users 15 may also include particular persons to which the service is directed.

The server system 12 is configured to communicate and share data with one or more user devices 16 over a network 18, and, conversely, the user devices 16 are configured to communicate and share data with the server system 12 via the network 18, which can include data entered by users 15, data from any of various applications running on the user devices 16, and data generated by the user devices 16 themselves (e.g., location/GPS data).

The network 18 may be or include any network that carries data. Non-limiting examples of suitable networks that may be used in whole or in part as network 18 include a private or non-private local area network (LAN), personal area network (PAN), storage area network (SAN), backbone network, global area network (GAN), wide area network (WAN), metropolitan area network (MAN), virtual private networks (VPN), or collection of any such communication networks such as an intranet, extranet or the Internet (i.e., a global system of interconnected networks upon which various applications or service run including, for example, the World Wide Web). The user devices 16 may communicate with the server system 12 over a wireless communication system that can include any suitable wireless communication technology. Non-limiting examples of suitable wireless communication technologies include various cellular-based data communication technologies (e.g., 2G, 3G, 4G, LTE, 5G, GSM, etc.), Wi-Fi wireless data communication, wireless LAN communication technology (e.g., 802.11), Bluetooth wireless data communication, Near Field Communication (NFC) wireless communication, other networks or protocols capable of carrying data, and combinations thereof. In some embodiments, network 18 is chosen from the internet, at least one wireless network, at least one cellular communication network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

The server system 12 is configured to communicate and share data with the user devices 16 associated with one or more users 15. Accordingly, the user device 16 may be embodied as any type of device for communicating with the server system 12. For example, at least one of the user devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure. At least one user device 16 may be, or may be operated as, an administrator console, e.g., for configuring and controlling operation of the server system 12.

Figure 2:
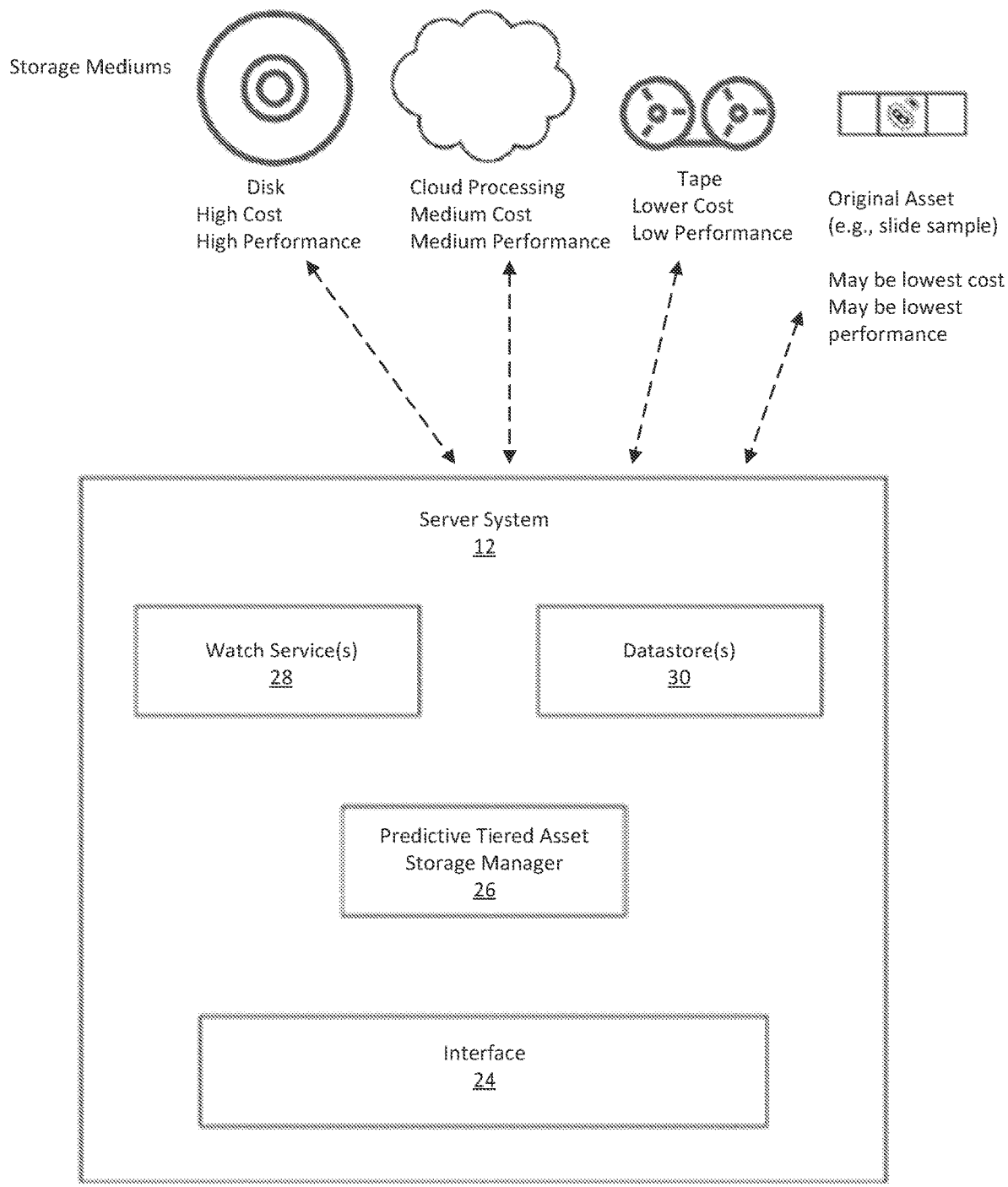
FIG. 2 is a schematic block diagram illustrating the server system of FIG. 1 in greater detail.

FIG. 2 is a block diagram illustrating the server system 12 in greater detail consistent with this disclosure. As shown, the server system 12 may include an interface 24, one or more datastores 30, and a predictive tiered asset storage manager 26 including one or more watch services 28. Among other things, the predictive tiered asset storage manager 26 obtains and processes various types of data relating to predictive tiered asset storage management utilizing various types of storage media from various storage providers (e.g., cloud storage, disk storage, tape storage, physical asset storage, etc., where cloud storage can include the ability to store data in a location that is not a local disk and may reside in a hyperscale, across an IoT set of physical asset locations, edge locations, satellite, extraterrestrial robot, or any other location that is not adequately represented by a disk). This data can include, for example, data relating to physical and digital assets stored or to be stored in the system (e.g., original physical assets and any corresponding digital assets), data relating to various storage media and storage providers (e.g., storage availability, storage cost, etc.), ESG data (e.g., ecological and carbon emissions), etc. The predictive tiered asset storage manager 26 maintains various data structures in the database(s) 30 for defining various storage tiers, tracking storage of assets across the various storage tiers, and defining user-specific rules for managing storage of assets based on ESG and/or other factors. The watch service(s) 28 monitor the various data and data structures for changes to any assets, storage, data structure content, or governance that will trigger a revisitation of the rules for possible adjustment of asset storage across the various storage media and tiers.

In this context, storage tiers can be defined in terms of virtually any criteria including, without limitation, physical storage criteria (e.g., types of storage facilities or media) and/or logical storage criteria (e.g., financial storage cost, storage/retrieval performance, amount of storage needed to store a digital asset, storage redundancy, storage compression, ESG factors, etc.). Thus, for example, storage tiers could be defined in terms of such things as physical storage of the original asset such as in a warehouse (which in some cases might be the lowest cost but lowest performance tier), storage of digital assets on tape drives (which might be a low cost but low performance tier), storage of digital assets on disk and/or solid state drives (which might be a high cost but high performance tier), storage of digital assets using cloud storage (which might be considered a medium cost but medium performance storage tier), etc. Additionally or alternatively, storage tiers could be defined in terms of the manner in which data is stored, e.g., different tiers associated with different storage redundancy schemes (e.g., a tier with no redundancy, a tier using mirroring, a tier using striping, etc.) or different tiers associated with compressed and uncompressed data. Additionally or alternatively, storage tiers could take into account ESG factors such as, for example, prioritizing storage at a facility that employs renewable energy sources, or prioritizing storage at a facility that is owned or operated in a socially-conscious manner (e.g., a woman-owned or minority-owned facility, or a facility operated by a company that is considered a leader in EDI initiatives). In any case, the system generally has at least two storage tiers from which to choose based on ESG and/or other factors, i.e., physical storage of the original asset and storage of a digital asset produced from the original asset, although the system can include virtually any number of storage tiers.

Based on these storage tiers, the predictive tiered asset storage manager 26 can cause digital assets to be deleted and/or moved among storage tiers (which in turn could include reformatting data and/or regenerating a digital asset from the original physical asset) based on ESG factors alone and/or in combination with other factors such as financial costs, and further based on the set of rules maintained for the storage user.

For example, under some conditions, the predictive tiered asset storage manager 26 could "demote" an asset from a current storage tier to an appropriate lower storage tier, which, under some conditions, might involve moving digital assets to a lower-cost storage tier, deleting one or more digital copies of the asset to reduce storage cost and/or free up storage space for alternative uses (which under some conditions could leave only the original physical asset in storage), or changing the way that the digital assets are stored (e.g., changing from storage of two mirrored copies of a digital asset to a single copy, which removes redundancy but might maintain retrieval performance, or compressing the digital asset, which might reduce storage utilization but slow down retrieval performance).

Thus, in certain embodiments, the predictive tiered asset storage manager 26 predicts environmental- and cost-minimizing placement and destruction of digital data with the least delay in the use of information for each storage user, use type, asset type, and storage type. In other words, when appropriate based on optimization criteria, the predictive tiered asset storage manager 26 will destroy/abandon digital representations of a physical artifact. This will lower future storage costs. If later a high-fidelity digital representation of the artifact is needed, it will (again) be digitized, e.g., scanned.

Similarly, under some conditions, the predictive tiered asset storage manager 26 could "promote" an asset to a higher storage tier. For example, if only the original physical asset is being stored (e.g., due to a demotion to a lower storage tier) and the rules associated with the asset indicate that a digital copy of the asset is desired provided such digital copy would meet the storage user's cost constraints, then the predictive tiered asset storage manager 26 could cause a digital copy of the original physical asset to be generated and stored in a higher storage tier.

Thus, in certain embodiments, there are cost functions associated with all movements between storage tiers, e.g., based on such things as whether the original physical asset still exists, whether the original physical asset is required to be saved, whether one or more digital copies are required (e.g., for online access), a prediction of access likelihood, the cost of future digitization (e.g., adjusted by a time-weighted probability of a future digitization being needed, and the cost differential of physical vs. digital storage), the cost to promote and demote data (which is generally different across each boundary), and the cost to hold data at each tier (which can include environmental impact costs, costs to deliver a desired level of reliability, costs to deliver a desired level of security, costs to deliver a desired quality of service, etc.). Consequently, embodiments generally enable direct customer demand to both increase transparency in ESG storage impact and decrease emissions associated with storage of assets, provide transparency into storage impacts, and enable predictive automation decisions that take into account sustainability and cost in determination of digital and physical asset storage and original asset handling.

In essence, then, certain embodiments provide a system and method of identifying and measuring the scope impact of the storage of assets which start with a physical medium, enabling storage users to determine the context in which they want to make decisions, set decision criteria, and automate the application of said criteria in the use of physical and digital asset management. To achieve this, the system enables the capture of all locations in which an asset can be stored. This includes physical assets and the digitized version. For each of these storage locations, the system uses predetermined criteria such as GHG protocol baseline scope emissions to store the emissions cost fields (aka carbon/kWh, emission/kilobyte, etc, scope 1, scope 2, scope 3) as well as chargeback (cost for the storage to the customer). Then, for each storage user, the system captures and stores their emission and cost goals and generates (in partnership with the company) the set of rules with which to automatically determine the placement and utilization of digital vs physical storage vs elimination of either asset. Any exceptions to the rules or conflicts can be used to produce notifications to invoke human input.

The following is a description of one exemplary non-limiting embodiment that demonstrates many of the concepts discussed above. This embodiment utilizes data structures containing at least the following types of information:

Customer (PK, CustomerName, CustomerGeographicLocation, Industry)

ESG (PK, CompanyFK, ESGContextType, GoalTimeFrame, Goal)

Storage (PK, CostByasset type(array), ESGContexts(array FK), ScopeEmissionsImpactBy(EmissionsBykWh, ByTbyte, ByOther), AccessRate, AccessTimeMax, AssetFormfactor, physcialGeographicLocation)

DigitizationCost (PK, DigitizationMechanism, CostofRecapturebyMByte, StorageType, AssetType)

Asset (PK, AssetName, AssetTypeFK, CurrentLocation, OriginalExists YN, metadata Arrays(type, identifiers, diagnostic))

AssetType (PK, MaterialsDefault, StorageRequirementsArray, UseCases, HandlingRules)

Governance (PK, Industry, RetentionPolicy, SovereigntyReqs, AccessServiceLevelAgreement(array))

Rules (PK, RuleName, CustomerFK, AssetTypeFK, IndustryFK, Factors, Metadata, Action)

Historian (PK, RecordofAllActionsArrays, recordofAccess)

Note that "PK" refers to a database primary key and "FK" refers to a database foreign key.

Figure 3:
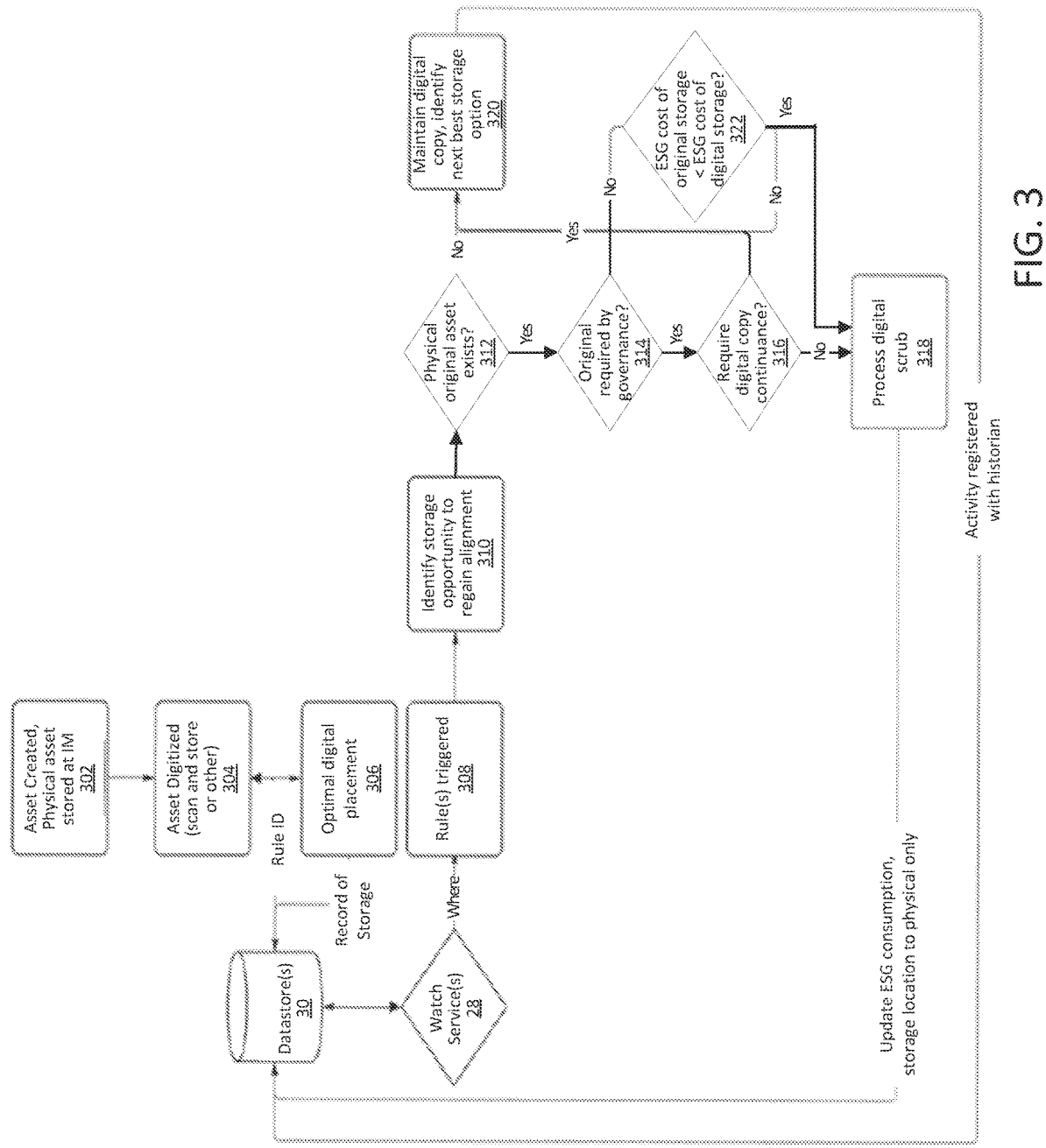
FIG. 3 is a schematic logic flow diagram for operation of the server system generally and the predictive tiered asset storage manager more specifically, in accordance with one exemplary embodiment.
Figure 4:
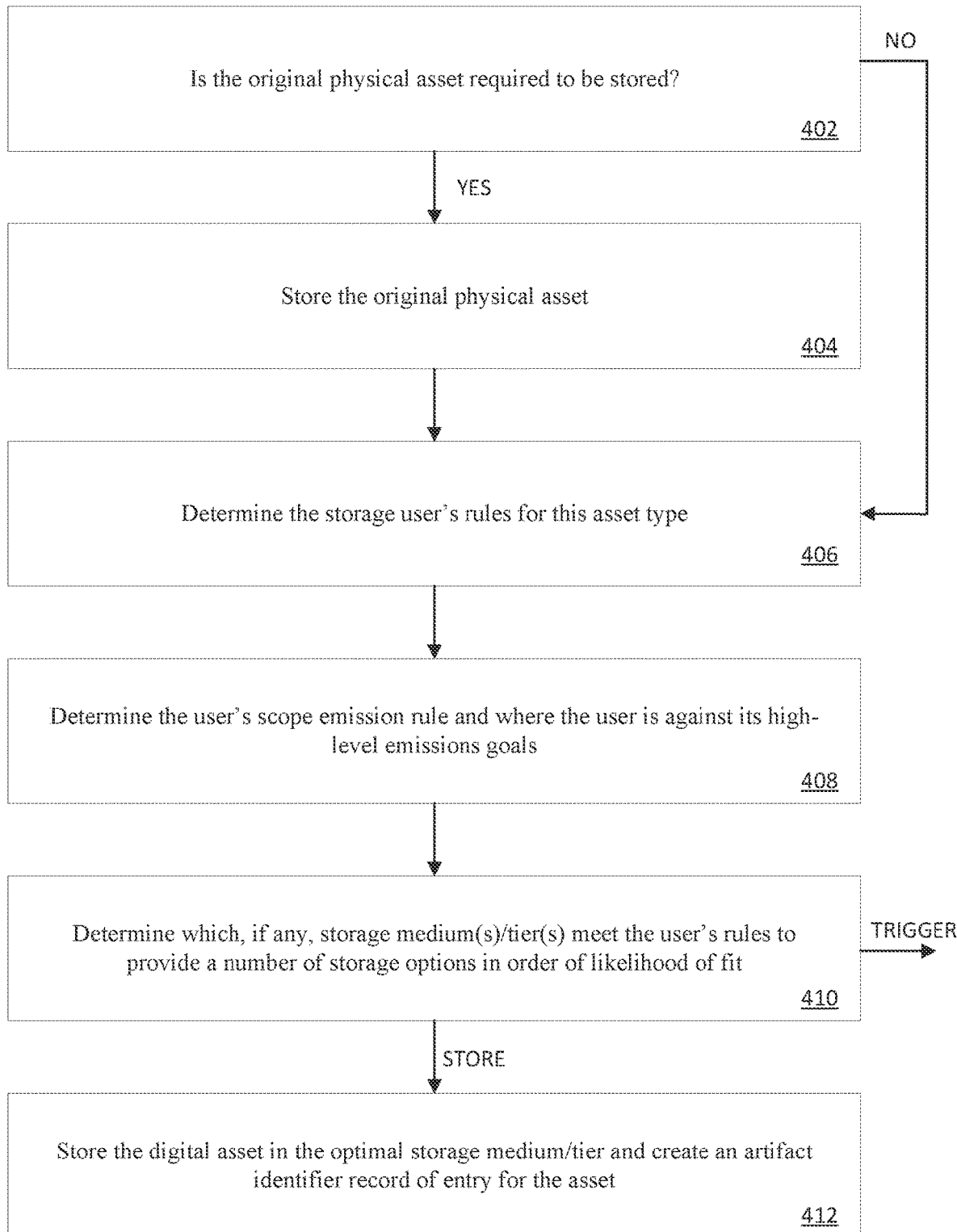
FIG. 4 is a schematic logic flow diagram for optimal digital placement for a digital asset, in accordance with one exemplary embodiment.

FIG. 3 is a schematic logic flow diagram for operation of the server system 12 generally and the predictive tiered asset storage manager 26 more specifically, in accordance with one exemplary embodiment. In block 302, a physical asset is brought into and registered with the system. Upon ingestion, the datastore(s) 30 are referenced to obtain all rules associated with the storage user that is storing the asset, the asset type, the governance requirements, the storage capabilities, the scope implications, etc. Permissions and rules are first utilized to determine the need for digitization. If the asset must be digitized (for access or other purposes), then the asset is digitized in block 304 and the optimal digital placement for the digital asset is determined based on such things as the storage user's emission and cost goals, in block 306. This can be achieved, for example, with a filter decision process based on the information from the data structure above, as depicted schematically in FIG. 4. Specifically, in this example, the system first determines if the original physical asset is required to be stored, in block 402. If yes, then the original is stored, in block 404; if no, then the original may be stored unless the cost of storing the original is outside of the user's cost rule or the emission cost for storing the original is outside of the scope of the user's rules, in which case the original may be discarded or at least not stored in a managed facility. Whether or not the original physical asset is stored, the system then determines the storage user's rules for this asset type (e.g., by access speed, scope, cost, governance), in block 406, and determines the user's scope emission rule and where the user is against its high-level emissions goals, in block 408. The system then determines which, if any, storage medium(s)/tier(s) meet the user's rules to provide a number of storage options in order of likelihood of fit, in block 410. If at least one viable storage location is identified within the parameters of the rules, then the system stores the digital asset in the optimal storage medium/tier and creates an artifact identifier record for the asset in the datastore(s) 30 as part of a database (referred to herein as the Historian) to allow for tracking the physical and/or digital asset(s), in block 412, otherwise the system may generate a trigger for human determination of storage locations.

Then, upon any change to any dataset content (inclusive of ESG, Storage, Emissions, offGassing, DigitizationCost, Asset, metadataArrays, governance or rules, etc.), one or more watch services 28 are triggered to determine whether or not the digital asset is still aligned with all rules, governance, emissions, and other goals, in block 308. If one or more rules suggesting possible deletion of the digital copy are triggered in block 308, then the system proceeds to identify storage opportunities to regain alignment, in block 310. Among other things, this includes first determining if the original physical asset still exists, in block 312. If the original physical asset still exists (YES in block 312), then the system determines if the original physical asset is required by governance rules, in block 314. If the original physical asset is required by governance rules (YES in block 314), then the system determines if the rules require that a digital copy be maintained, in block 316. If the rules do not require that a digital copy be maintained (NO in block 316), then the system deletes the digital copy in block 318, updates ESG consumption metrics (e.g., since the digital copy has been deleted, the asset now should be associated with a lower emission cost) and updates the artifact identifier record in the Historian to indicate that the asset is now stored as physical only. It should be noted that the rules could suggest deletion of the digital copy based on any of a wide range of criteria, such as (but not limited to) a change in estimation of likelihood of a future need to access a digital representation of the physical artifact, a change in storage cost of the physical artifact, a change in storage cost of the digital representation of the physical artifact, a change in availability of storage options for a digital representation of the physical artifact, a change in user access time to a digital representation of the physical artifact (where user access time can be defined as the time from an access request until the requested information is made available to a user, which can depend on the storage medium involved, where the user is, the delivery medium performance such as Internet or other network performance, availability of information access devices such as a computer, etc.). In the context of this description and the appended claims, a "change" can include a change from not having something to having that thing for a first time.

If the original physical asset does not exist (NO in block 312), then the system must maintain a digital copy, although the system could move the digital copy to a next best storage option (e.g., a lower storage tier), in block 320, in which case any activity is registered with the Historian to update the artifact identifier record.

If the original physical asset exists but is not required by governance (NO in block 314), then the system evaluates the cost of storing the original vs the cost of storing the digital copy (based in ESG and/or other factors), in block 322. If the cost of storing the original is lower than the cost of storing the digital copy (YES in block 322), then the system deletes the digital copy in block 318, updates ESG consumption metrics (e.g., since the digital copy has been deleted, the asset now should be associated with a lower emission cost) and updates the artifact identifier record in the Historian to indicate that the asset is now stored as physical only. Otherwise (NO in block 322), the system maintains a digital copy, although the system could move the digital copy to a next best storage option (e.g., a lower storage tier), in block 320, in which case any activity is registered with the Historian to update the artifact identifier record.

If the original physical asset exists and the rules require that a digital copy be maintained (YES in block 316), then the system maintains a digital copy, although the system could move the digital copy to a next best storage option (e.g., a lower storage tier), in block 320, in which case any activity is registered with the Historian to update the artifact identifier record.

Figure 5:
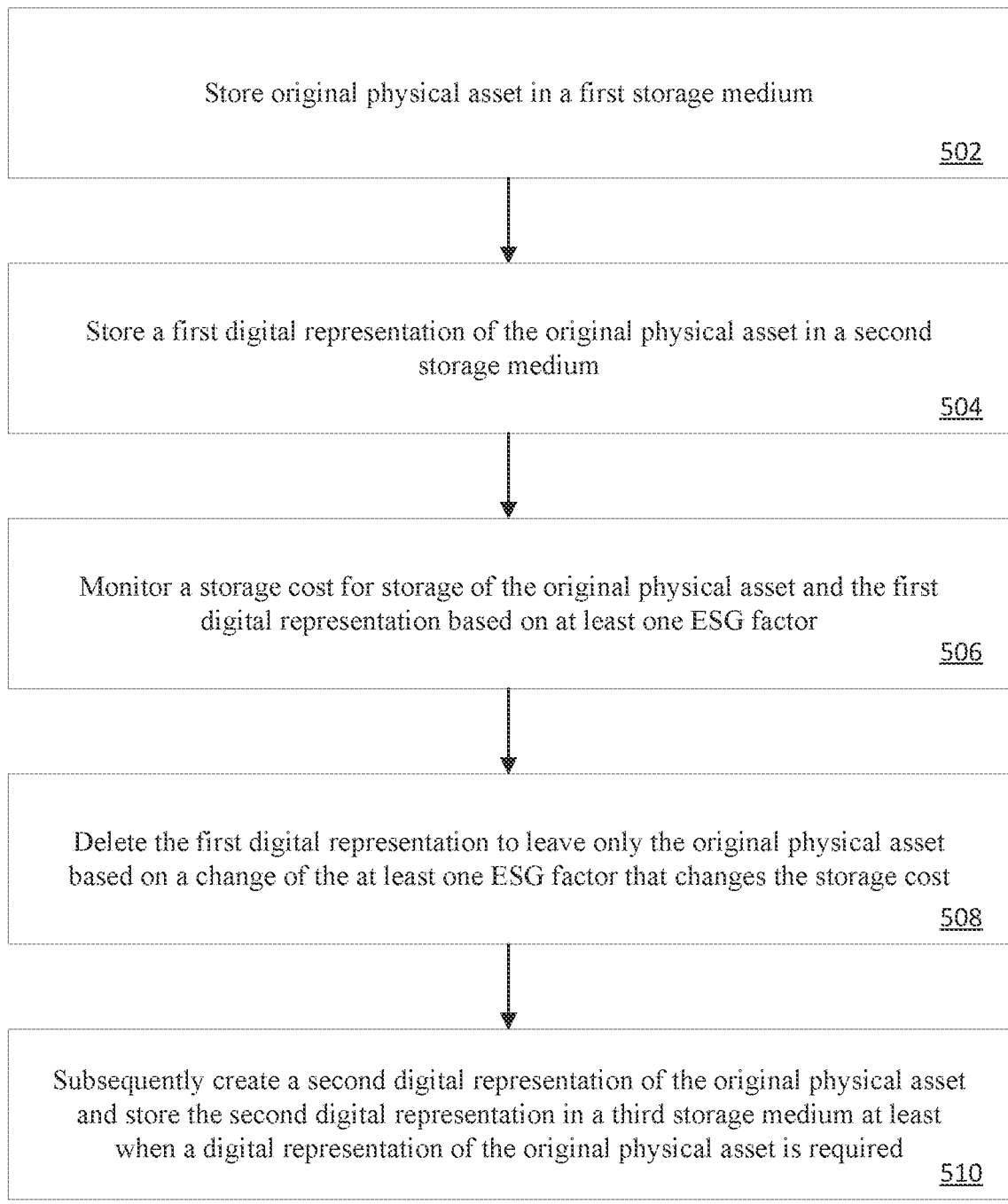
FIG. 5 is a schematic logic flow diagram for predictive tiered asset storage based on environmental, social, and governance (ESG) factors, in accordance with one embodiment.

FIG. 5 is a schematic logic flow diagram for predictive tiered asset storage based on environmental, social, and governance (ESG) factors, in accordance with one embodiment. In block 502, an original physical asset is stored in a first storage medium. In block 504, a first digital representation of the original physical asset is stored in a second storage medium different than the first storage medium. In block 506, a storage cost for storage of the original physical asset and the first digital representation is monitored based on at least one ESG factor associated with the asset. In block 508, the first digital representation is deleted from the second storage medium to leave only the original physical asset based on a first change of the at least one ESG factor that changes the storage cost. In block 510, a second digital representation of the original physical asset is subsequently created and stored in a third storage medium at least when a digital representation of the original physical asset is required in the system.

It should be noted that storage of the original physical asset in the first storage medium and the first digital representation of the original physical asset in the second storage medium may represent a first storage tier of a plurality of storage tiers and deletion of the first digital representation from the second storage medium to leave only the original physical asset may represent a second tier of the plurality of storage tiers, in which case causing deletion of the first digital representation from the second storage medium to leave only the original physical asset may be further based on a cost for transitioning from the first storage tier to the second storage tier, a cost for subsequently causing creation of the second digital representation, and a likelihood that the digital representation will be required. The cost to store the first digital representation in the second storage medium may exceed the cost to store the original physical asset in the first storage medium for a given amount of time. Monitoring the storage cost may be based on a set of stored storage management rules that define the storage cost based on the at least one ESG factor and that are triggered by one or more watch services. The at least one ESG factor may be based on at least one scope defined by World Resources Institute GHG Protocol Initiative. Deletion of the first digital representation may be further based on a change in estimation of likelihood of a future need to access a digital representation of the physical asset, a change in storage cost of the physical asset, a change in storage cost of the first digital representation, a change in availability of storage options for a digital representation of the physical asset, and/or a change in user access time to a digital representation of the physical asset. The process may utilize an artifact identifier record referencing the original physical asset stored in the first storage medium and the first digital representation stored in the second storage medium, where the artifact identifier record includes the storage cost for storage of the original physical asset and the first digital representation, and where the storage cost in the artifact identifier record is updated when the first digital representation is deleted and again when the second digital representation is created and stored, such that the artifact identifier record tracks the storage cost for the asset based on at least one ESG factor. Embodiments are not limited to any particular type(s) of original physical assets. For example, the original physical asset can include a specimen that can be represented digitally but cannot be replicated in full.

It should be noted that the use of a historian to maintain a record of access and storage locations enables a historical comparison of access against asset metadata to enable the suggestion of new rules and behaviors. This can be automatically or "human-in-the-loop" (HITL) approved to determine the likelihood of future asset access and weighing against scope desires for determining the need to store the digitized version of the asset. Also, based on this historical information, a prediction "map" can be generated and used to optimize decisions on when and where to move data, including in some cases dropping all digital representations and falling back to the original, as discussed herein.

It also should be noted that the historical information and rules could be used for other storage management operations including user-specific storage management operations and "global" storage management operations (i.e., not tied to any specific user). For example, if a user already contracts for 1 TB of cloud storage and is predicted to need additional storage capacity, then, before contracting for more storage capacity, the system could use or trigger the user's rules to look for data that can safely be compressed or deleted to free up storage space, independently of any ESG or other cost trigger. Similarly, if a storage facility is predicted to need additional storage capacity, then, before adding more storage capacity, the system could use or trigger rules across one or more users to look for data that can safely be compressed or deleted to free up storage space.

The system could include various types of "backend" analytics to make predictions and management/operational recommendations. For example, based on a given set of rules, the system could identify ways to improve ESG cost scores without, say, deleting data or installing more efficient storage devices, e.g., buying carbon credits, donating money to organizations that reduce carbon emissions elsewhere or support EDI initiatives, purchasing electricity from alternative energy sources, implementing alternative energy sources, etc.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the server system 12 including the predictive tiered asset storage manager 26 and one or more watch services 28) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, potential subject matter that may be claimed (prefaced with the letter "P" so as to avoid confusion with the actual claims presented below) includes:

P1. A method of managing stored information involving creating an artifact identifier record referencing at least one of: a physical artifact or a digital representation of the physical artifact, and deleting a digital representation of the physical artifact, and subsequently creating a new digital representation of the physical artifact based on information stored in an artifact identifier record.

P2. The method of claim P1 where the physical artifact is a medium which encases unique physical specimen(s) which can be represented digitally but cannot be replicated in full (e.g., a slide suitable for viewing in a microscope, tissue slice samples, test tube with liquid contents, a jar containing preserved organic matter, a guitar held by Prince, an original Monet).

P3. The method of claim P1 or claim P2 where the cost of storing the physical artifact for a period of time exceeds the cost of storing a digital representation of the physical artifact for the same period of time.

P4. The method of claim P1 or claim P2 where deletion the digital representation of the physical artifact is triggered by at least one of: a change in estimation of likelihood of a future need to access a digital representation of the physical artifact, a change in storage cost of the physical artifact, a change in storage cost of the digital representation of the physical artifact, a change in availability of storage options for a digital representation of the physical artifact, a change in user access time to a digital representation of the physical artifact.

P5. A method of managing stored information involving creating a digital representation of a physical artifact, and creating an artifact identifier record referencing at least one of: a physical artifact or a digital representation of the physical artifact, and storing the digital representation in a first storage medium, and moving the digital representation to a second storage medium triggered by least one of: a change in estimation of likelihood of a future need to access a digital representation of the physical artifact, a change in storage cost of the physical artifact, a change in storage cost of the digital representation of the physical artifact, a change in availability of storage options for a digital representation of the physical artifact, a change in user access time to a digital representation of the physical artifact.

P6. The method of claim P5 where the cost of storage in the second storage medium is different than the cost of storage in the first storage medium.

P7. The method of claim P5 where the user access time to a digital representation of the physical artifact stored in the second storage medium is different than the user access time to a digital representation of the physical artifact stored in the first storage medium.

P8. Enablement of scope and emission reporting per asset, inclusive of physical and digital storage. The generation of physical scope calculations associated with the storage location and mediums, along with the record of history (as captured by a historian) enables us to enable reporting capabilities that show by asset what the likely emissions impact and cost impact are by Asset, by company (cross assets), by asset grouping, or by other metadata characteristics.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A system for predictive tiered asset storage based on environmental, social, and governance (ESG) factors, the system comprising:
   at least one processor coupled to at least one memory containing instructions which, when executed by the at least one processor, cause the system to perform processes comprising:
   causing storage of an original physical asset in a first storage medium;
   causing storage of a first digital representation of the original physical asset in a second storage medium different than the first storage medium;
   monitoring a set of storage parameters for the original physical asset including a storage cost for storage of the original physical asset and the first digital representation, wherein the storage cost is based on at least one ESG factor associated with the asset;
   causing deletion of the first digital representation from the second storage medium to leave only the original physical asset based on a first change of the at least one ESG factor that changes the storage cost; and continuing monitoring of the set of storage parameters to determine when another digital representation of the original physical asset is required in the system.

2. A system according to claim 1, wherein storage of the original physical asset in the first storage medium and the first digital representation of the original physical asset in the second storage medium represents a first storage tier of a plurality of storage tiers and deletion of the first digital representation from the second storage medium to leave only the original physical asset represents a second tier of the plurality of storage tiers, and wherein causing deletion of the first digital representation from the second storage medium to leave only the original physical asset is further based on a cost for transitioning from the first storage tier to the second storage tier, a cost for subsequently causing creation of the second digital representation, and a predicted likelihood that the second digital representation will be required.

3. A system according to claim 1, wherein the cost to store the first digital representation in the second storage medium exceeds the cost to store the original physical asset in the first storage medium for a given amount of time.

4. A system according to claim 1, wherein monitoring the storage cost is based on a set of stored storage management rules that define the storage cost based on the at least one ESG factor and that are triggered by one or more watch services.

5. A system according to claim 1, wherein the at least one ESG factor is based on at least one scope defined by World Resources Institute GHG Protocol Initiative.

6. A system according to claim 1, wherein causing deletion of the first digital representation is further based on at least one of:
a change in estimation of likelihood of a future need to access a digital representation of the physical asset;
a change in storage cost of the physical asset;
a change in storage cost of the first digital representation;
a change in availability of storage options for a digital representation of the physical asset; or
a change in user access time to a digital representation of the physical asset.

7. A system according to claim 1, wherein the processes further comprise:
creating and storing an artifact identifier record referencing the original physical asset stored in the first storage medium and the first digital representation stored in the second storage medium, the artifact identifier record including the storage cost for storage of the original physical asset and the first digital representation;
updating the storage cost in the artifact identifier record when the first digital representation is deleted; and
updating the storage cost in the artifact identifier record when the second digital representation is created and stored, wherein the artifact identifier record tracks the storage cost for the asset based on at least one ESG factor.

8. A system according to claim 1, wherein the processes further comprise:
causing creation of a second digital representation of the original physical asset and storage of the second digital representation in a third storage medium upon determining that another digital representation of the original physical asset is required in the system.

9. A computer-implemented method for predictive tiered asset storage based on environmental, social, and governance (ESG) factors, the method comprising:
causing storage of an original physical asset in a first storage medium;
causing storage of a first digital representation of the original physical asset in a second storage medium different than the first storage medium;
monitoring a set of storage parameters for the original physical asset including a storage cost for storage of the original physical asset and the first digital representation, wherein the storage cost is based on at least one ESG factor associated with the asset;
causing deletion of the first digital representation from the second storage medium to leave only the original physical asset based on a first change of the at least one ESG factor that changes the storage cost; and
continuing monitoring of the set of storage parameters to determine when another digital representation of the original physical asset is required in the system.

10. A method according to claim 9, wherein storage of the original physical asset in the first storage medium and the first digital representation of the original physical asset in the second storage medium represents a first storage tier of a plurality of storage tiers and deletion of the first digital representation from the second storage medium to leave only the original physical asset represents a second tier of the plurality of storage tiers, and wherein causing deletion of the first digital representation from the second storage medium to leave only the original physical asset is further based on a cost for transitioning from the first storage tier to the second storage tier, a cost for subsequently causing creation of the second digital representation, and a predicted likelihood that the second digital representation will be required.

11. A method according to claim 9, wherein the cost to store the first digital representation in the second storage medium exceeds the cost to store the original physical asset in the first storage medium for a given amount of time.

12. A method according to claim 9, wherein monitoring the storage cost is based on a set of stored storage management rules that define the storage cost based on the at least one ESG factor and that are triggered by one or more watch services.

13. A method according to claim 9, wherein the at least one ESG factor is based on at least one scope defined by World Resources Institute GHG Protocol Initiative.

14. A method according to claim 9, wherein causing deletion of the first digital representation is further based on at least one of:
a change in estimation of likelihood of a future need to access a digital representation of the physical asset;
a change in storage cost of the physical asset;
a change in storage cost of the first digital representation;
a change in availability of storage options for a digital representation of the physical asset; or
a change in user access time to a digital representation of the physical asset.

15. A method according to claim 9, wherein the processes further comprise:
creating and storing an artifact identifier record referencing the original physical asset stored in the first storage medium and the first digital representation stored in the second storage medium, the artifact identifier record including the storage cost for storage of the original physical asset and the first digital representation;

updating the storage cost in the artifact identifier record when the first digital representation is deleted; and updating the storage cost in the artifact identifier record when the second digital representation is created and stored, wherein the artifact identifier record tracks the storage cost for the asset based on at least one ESG factor.

16. A method according to claim 9, further comprising:

causing creation of a second digital representation of the original physical asset and storage of the second digital representation in a third storage medium upon determining that another digital representation of the original physical asset is required in the system.

17. A computer program product comprising at least one tangible, non-transitory computer-readable medium having embodied therein computer program instructions for predictive tiered asset storage based on environmental, social, and governance (ESG) factors, which, when executed by at least one processor of a computer server system, cause the computer server system to perform processes comprising:

causing storage of an original physical asset in a first storage medium;

causing storage of a first digital representation of the original physical asset in a second storage medium different than the first storage medium;

monitoring a set of storage parameters for the original physical asset including a storage cost for storage of the original physical asset and the first digital representation, wherein the storage cost is based on at least one ESG factor associated with the asset;

causing deletion of the first digital representation from the second storage medium to leave only the original physical asset based on a first change of the at least one ESG factor that changes the storage cost; and continuing monitoring of the set of storage parameters to determine when another digital representation of the original physical asset is required in the system.

18. A computer program product according to claim 17, wherein storage of the original physical asset in the first storage medium and the first digital representation of the original physical asset in the second storage medium represents a first storage tier of a plurality of storage tiers and deletion of the first digital representation from the second storage medium to leave only the original physical asset represents a second tier of the plurality of storage tiers, and wherein causing deletion of the first digital representation from the second storage medium to leave only the original physical asset is further based on a cost for transitioning from the first storage tier to the second storage tier, a cost for subsequently causing creation of the second digital representation, and a predicted likelihood that the second digital representation will be required.

19. A computer program product according to claim 17, wherein the cost to store the first digital representation in the second storage medium exceeds the cost to store the original physical asset in the first storage medium for a given amount of time.

20. A computer program product according to claim 17, wherein monitoring the storage cost is based on a set of stored storage management rules that define the storage cost based on the at least one ESG factor and that are triggered by one or more watch services.

21. A computer program product according to claim 17, wherein the at least one ESG factor is based on at least one scope defined by World Resources Institute GHG Protocol Initiative.

22. A computer program product according to claim 17, wherein causing deletion of the first digital representation is further based on at least one of:

a change in estimation of likelihood of a future need to access a digital representation of the physical asset;

a change in storage cost of the physical asset;

a change in storage cost of the first digital representation;

a change in availability of storage options for a digital representation of the physical asset; or a change in user access time to a digital representation of the physical asset.

23. A computer program product according to claim 17, wherein the processes further comprise:

creating and storing an artifact identifier record referencing the original physical asset stored in the first storage medium and the first digital representation stored in the second storage medium, the artifact identifier record including the storage cost for storage of the original physical asset and the first digital representation;

updating the storage cost in the artifact identifier record when the first digital representation is deleted; and updating the storage cost in the artifact identifier record when the second digital representation is created and stored, wherein the artifact identifier record tracks the storage cost for the asset based on at least one ESG factor.

24. A computer program product according to claim 17, wherein the processes further comprise:

causing creation of a second digital representation of the original physical asset and storage of the second digital representation in a third storage medium upon determining that another digital representation of the original physical asset is required in the system.

* * * * *